Figure 1:
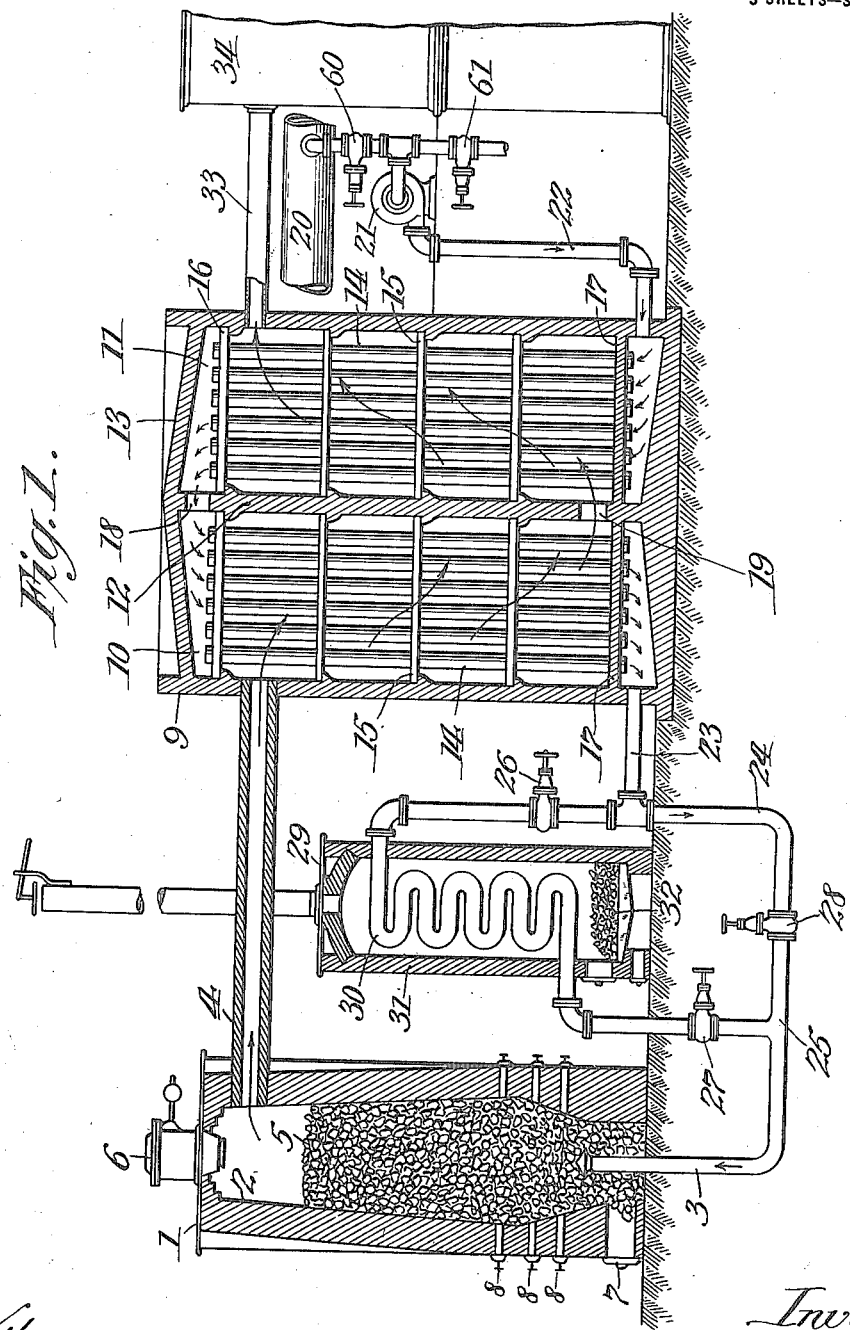

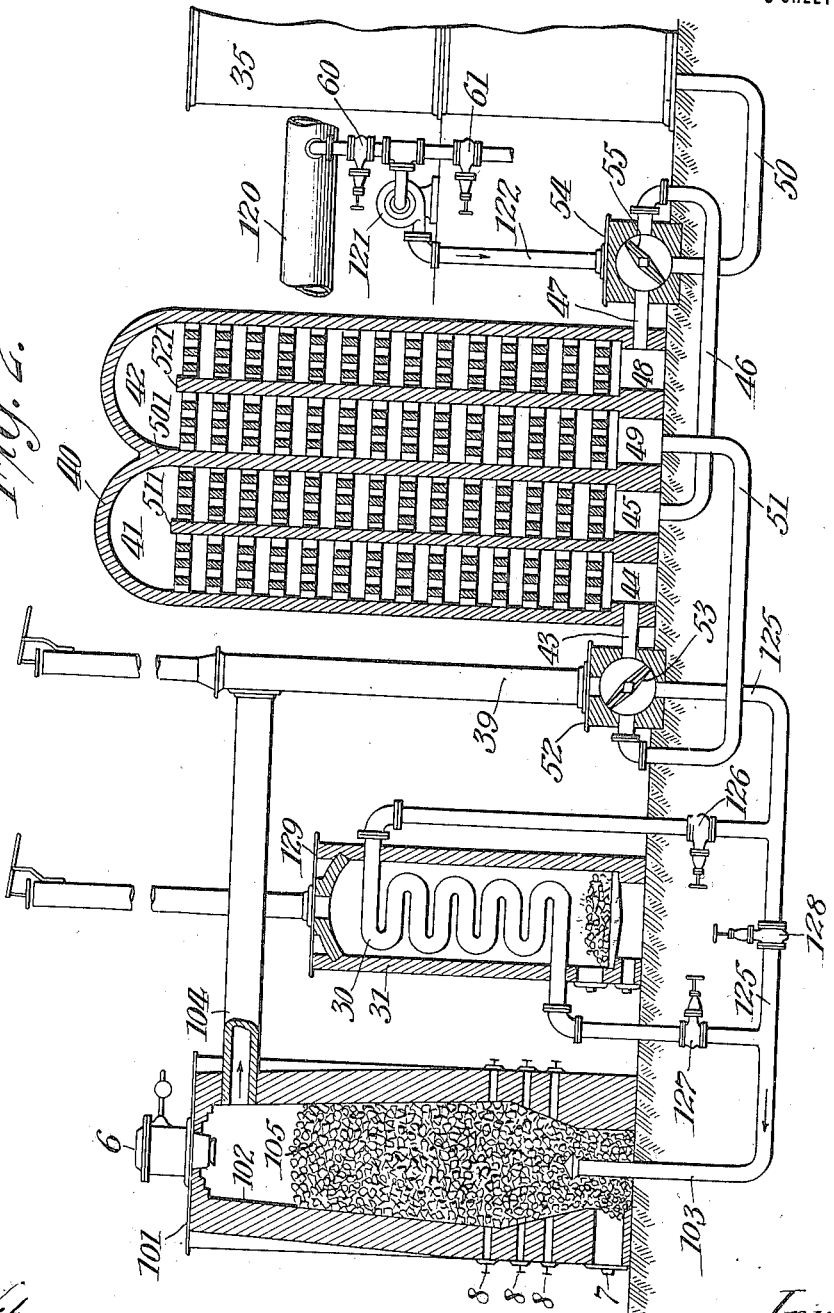

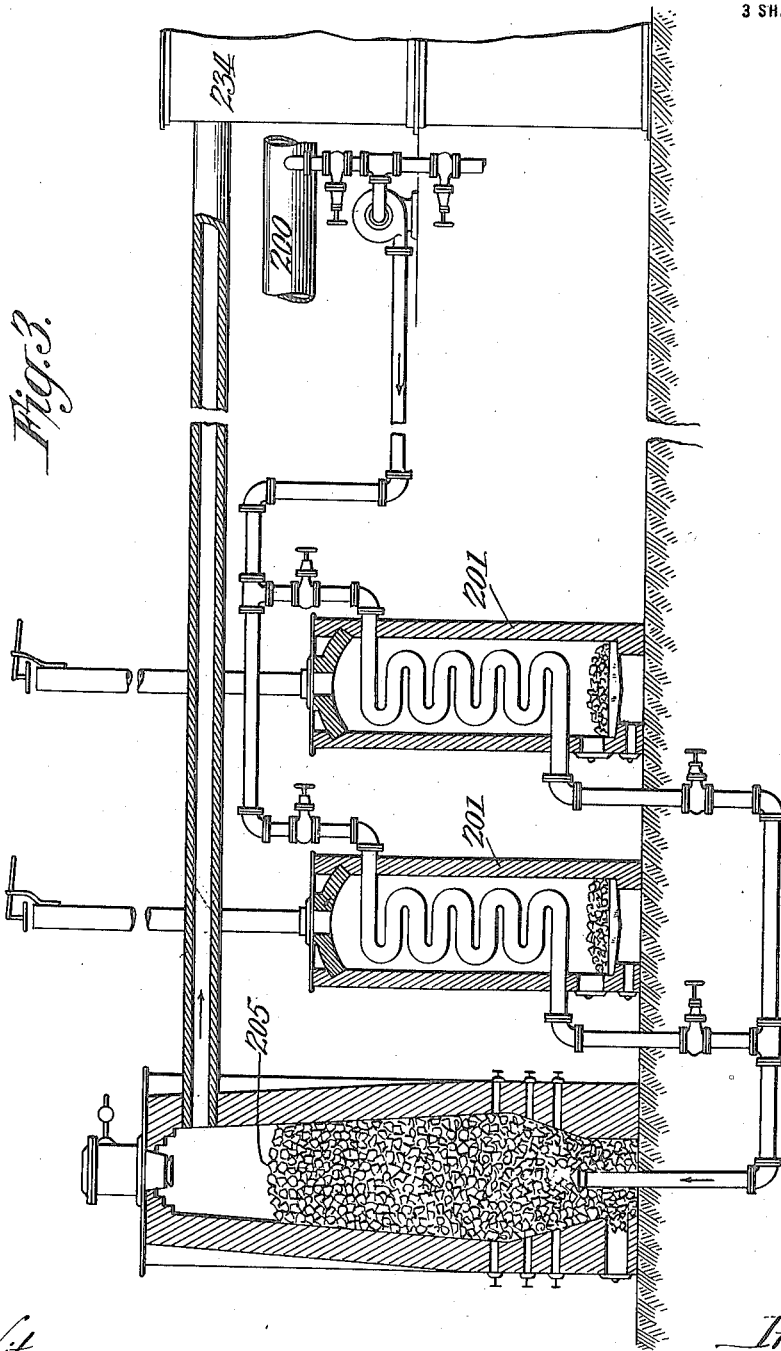

UNITED STATES PATENT OFFICE.

WILLIAM F. LAMOREAUX, OF ISABELLA, TENNESSEE.

PROCESS FOR RECOVERING ELEMENTAL SULFUR FROM SULFUR GASES.

1,169,726.  Specification of Letters Patent.  Patented Jan. 25, 1916.

Application filed February 8, 1915. Serial No. 6,909.

*To all whom it may concern:*

Be it known that I, WILLIAM F. LAMOREAUX, a citizen of the United States, residing at Isabella, in the county of Polk and State of Tennessee, have invented certain new and useful Improvements in Processes for Recovering Elemental Sulfur from Sulfur Gases, of which the following is a specification.

In a copending application of Lamoreaux and Renwick, Serial No. 774,970, filed June 21, 1913, there is disclosed a process of reducing sulfur dioxid, such for example as that contained in the gases generated by or liberated from any furnace smelting, roasting or calcining pyritic ores or other sulfur-bearing materials, by maintaining the sulfur dioxid for a predetermined period in contact with incandescent carbon, and supplying the increment of heat necessary to secure practically complete reduction to elemental sulfur from a source independent of the oxidation of said carbon. According to the above application this increment of heat is preferably supplied electrically, for example by passing a suitable electric current through the carbon bed.

According to the present process the necessary increment of heat is supplied to the sulfur dioxid or to the gases containing the same, before bringing them into contact with the bed of glowing carbon: and preferably a portion at least of the heat so applied is derived by heat-interchange from the outflowing highly-heated gases carrying the reduced sulfur. By proceeding in this manner I effect a very material economy of heat, and I may also avoid the use of electrical energy in places where this is either not available or is very costly.

By my new process I have effected a substantially complete liberation of the sulfur from its gaseous compounds by subjecting the gas to a temperature of 1200° C. or higher produced by passing said gas through a mass of incandescent coke, initially preheating the gas to a sufficiently high degree to compensate for any and all deficiency of temperature resulting from the dissipation of heat due to endothermic reactions, radiation, and other losses occurring within the reaction zone, and finally conserving and utilizing for preheating purposes the heat otherwise wasted in the gases issuing from the furnace, so that as far as possible the heat is caused to flow in cyclic order throughout the process, while the gas after having undergone the reduction reaction is removed to a suitable condenser wherein the elemental sulfur is collected.

The body or mass of incandescent carbon or carbonaceous material, the arrangement of the means and forces employed to control the rate of movement of the gas are preferably such as to cause the complete reduction of the gas within the time of its traversing said carbon mass.

I attain the objects of my invention in a number of ways, several of which are illustrated in the accompanying drawings forming a part of this specification, in which:

Figure 1 is a view, partly in section, representing the arrangement of the apparatus employed, comprising the reduction furnace, gas-preheating furnace and a recuperative furnace wherein the waste heat is conserved and utilized for preheating purposes; Fig. 2 is a view, partly in section, representing an arrangement of apparatus similar to Fig. 1, except that a regenerative furnace instead of a recuperative furnace is employed for conserving the waste heat utilizing the same for preheating purposes; and Fig. 3 is a view partly in section of a third modification in which the sulfur-bearing gases pass direct to an auxiliary heater supply pipe.

In Fig. 1, the numeral 1 designates the reduction furnace, in which 2 designates the furnace shaft having a gas inlet 3 at the bottom, and a gas exit 4 in the upper portion of the shaft. A body of coke 5 is charged into the furnace shaft through the charging hopper 6 which is so arranged as to admit the charges of coke and at the same time exclude the entrance of air from the outside or escape of gas from the inside of the furnace. The ashes and clinker from the consumed coke or other carbonaceous material slowly descend to the bottom of the shaft to the cleaning door 7 where they can be removed from time to time. Sight holes 8 are provided for inspection of the interior condition of the furnace. The current of gas entering the furnace through the entrance pipe 3 will pass up through the coke mass wherein the thermal and chemical reactions take place, thence through the exit pipe 4 to the recuperative furnace 9, thence passing through the recuperative furnace and out by way of the pipe 33 to the condensing apparatus 34 wherein the elemental sulfur is condensed and collected. The recuperative furnace is of the double surface type, and may be of any standard make but is preferably constructed of refractory clay tiles and pipe arranged in a manner similar to the one shown. Such a recuperative furnace will ordinarily consist of a brickwork chamber, divided into two compartments, 10 and 11, by the partition wall 12, the whole being covered by a suitable roof 13. Within the compartments so formed, refractory clay pipes 14 are arranged preferably vertically, being separated and supported by the tiles 15. By means of top and bottom partition plates 16 and 17 respectively, the gases to be heated are compelled to flow through the pipes 14, following the directions as indicated by the small arrows, while the exit gases from the reduction furnace carrying the waste heat to be conserved and utilized for preheating purposes are compelled to flow between and around the pipes 14, following the directions as indicated by the large arrows. The two gases, i. e., the gas to be preheated and the gas employed for heating purposes are thus prevented from intermingling and mixing; but, flowing in counter-parallel directions, the hotter gas transmits its heat through the walls of the pipes 14 to the cooler gas within, thereby heating the latter gas to a temperature approximating that of the hotter gas. In my process, the gas to be heated consists of the sulfur-bearing gases, which are drawn from their source of production through the flue or gas-main 20 by means of the centrifugal fan 21 which in turn delivers the gas through the pipe 22 to the recuperative furnace; therein the sulfur bearing gas is preheated by means of the hot exit gas from the reduction furnace as in the manner just described. From the recuperative furnace, the now preheated sulfur-bearing gas is delivered through the pipes 23—24—25 and 3 in turn, to the reduction furnace, the valves 26 and 27 being closed and valve 28 being open. It will thus be evident that the heat produced, generated and employed in the reduction process passes in cyclic order from the reduction furnace to and through the recuperative furnace and thence back to the reduction furnace. In case, however, due to endothermic chemical reactions or heat losses due to radiation or other causes, a sufficiently high degree of temperature cannot be maintained within the mass of carbon, I then resort to the preheating of the sulfur-bearing gases in the auxiliary heat-transfer apparatus indicated by numeral 29. This heat-transfer apparatus may be of any standard construction but is preferably constructed of highly refractory clay pipe, tile or equivalent material, but to illustrate the parallel counter-flow principle of heat transfer, I have illustrated a coiled pipe 30 inclosed within the brick heating-chamber 31. The source of heat for preheating the gases passing through the pipe 30 may be obtained from the grate fire 32, or instead oil-burners or gas-burners may be employed according to standard practice. By closing or adjusting valve 28 and opening valves 26 and 27, all or a portion of the sulfur-bearing gases are caused to flow through the auxiliary heater 29, there to be preheated to such a temperature as will compensate for any and all heat deficiency as may result within the reduction furnace.

Fig. 2 illustrates a modification of my invention wherein a regenerative furnace is employed for conserving the waste heat contained in the exit gases from the reduction process and utilizing the same for preheating the sulfur-bearing gases before undergoing the reduction process. The regenerative furnace may be of any standard construction, but preferably arranged in a manner similar to that illustrated and designated by the numeral 40. This arrangement comprises a brickwork chamber divided vertically, by the partition wall 501, into two chambers, 41 and 42 respectively; these chambers having no communication with each other. Each chamber, 41 and 42, is in turn divided into two compartments by the center partition walls, 511 and 521 respectively, and each of the compartments thus formed is closely packed with a checkerwork of refractory clay tiles so stacked and arranged in layers and tiers as to permit free circulation and passage of the gases between and around the tiles. At either side of the regenerative furnace, and connecting directly thereto by means of short lengths of pipe, 43 and 47 respectively, are valve-boxes 52 and 54 respectively, containing valves 53 and 55 respectively; the use and method of operation of these valves being explained later. In carrying out my improved process, making use of the apparatus illustrated in Fig. 2, the sulfur-bearing gases to be treated are drawn through the flue or gas-main 120, from their source of production, by means of the centrifugal fan 121 which in turn delivers the gases through pipe 122 to the valve-box 54, thence passing the valve 55 (set in the position shown), the gases enter through pipe 47 into the lower portion 48 of the chamber 42; thence ascending through the checker-work to the upper portion of the chamber 42, they pass over the top of partition wall 521 and descend through the checker-work into the lower portion 49; thence through pipe 51 to the valve-box 52, passing the valve 53 (set in the position shown), the gases pass through the pipe 125 (valve 128 being open and valves 126 and 127 closed) and enter the reduction furnace 101 at the inlet pipe 103. It is assumed that the column of coke 105 has previously been heated to incandescence through the procedure to be explained later. The sulfur-bearing gases are in contact with the coke for a predetermined period, as explained in the application of Lamoreaux and Renwick, above noted, and are completely and rapidly decomposed, liberating the sulfur from its compounds while passing through the column of coke, provided the temperature is maintained at 1200° C. or higher. The elemental sulfur thus liberated in the form of vapor, together with the products of combustion and also the nitrogen originally contained in the gases, all leave the furnace shaft 102 through the exit pipe 104, pass along through pipe 39 and enter valve-box 52; thence passing valve 52 (set in the position shown) and through pipe 43 the gases enter the lower portion of the regenerative furnace. Owing to the high temperature maintained within the coke column 105, it follows that the gases passing through the reduction furnace 101, must be highly heated and, except for slight radiation losses, carry the far greater portion of their heat into the regenerative furnace, thence passing upward in chamber 41, over partition wall 511 and again downward through the checkerwork contained in these compartments, they transmit their heat to the brickwork, elevating it to a temperature approximating that of the hot gases. Leaving the compartment 45 through the pipe 46, the gases now enter the valve-box 54; thence pass valve 55 (set in the position shown) through pipe 50 and enter the condensing apparatus 35 where the elemental sulfur is condensed and collected. Both valves are allowed to remain in the positions shown and the gases caused to circulate in the directions just indicated until the checkerwork in compartments 44 and 45 respectively, have absorbed a sufficient amount of heat to become highly elevated in temperature. Meanwhile it will be found that the temperature within the coke column in the reduction furnace is gradually decreasing but before the temperature falls to a point that would seriously impair the practically complete decomposition of the sulfur compounds, then the valves 53 and 55 respectively are each revolved through an arc of 90°, thereby reversing the flow of the gases through the regenerative furnace. In this manner, by repeated reversals of the gas flow at properly timed intervals, the cold sulfur-bearing gases are caused to pass over the highly heated checkerwork in one chamber of the regenerative furnace, abstracting heat therefrom and in turn becoming preheated, while at the same time the hot exit gases are transmitting their waste heat to the checkerwork in the other chamber, heating them preparatory to the succeeding reversal of gas flow. In case it becomes desirable or necessary to preheat the sulfur-bearing gases to a temperature higher than that attainable by means of the regenerative effect, then I resort to additional preheating in the auxiliary preheater 129, in the same manner as described under Fig. 1.

A further modification of my invention is illustrated in Fig. 3, wherein the sulfur-bearing gases from the supply 200, pass direct to one or more independent preheating furnaces 201 wherein they are heated to the desired temperature, and from there into the reduction furnace 205, in which the reactions heretofore described take place, the products of the reaction containing the reduced sulfur passing direct into the condenser 234. The operation otherwise is the same as with Figs. 1 and 2. It is evident, however, that the conservation of the waste heat by means of any heat transfer apparatus, similar to the recuperative or regenerative furnaces described above, will effect a more efficient and economical working of my process.

In either of the modifications heretofore described by preheating the sulfur-bearing gases to a sufficiently high degree before entering the mass of highly heated coke or other carbonaceous material within the reduction furnace, it is possible to secure a rapid and complete reduction of the elemental sulfur from its gaseous compounds existing in the gases being treated.

Having described several modifications of apparatus and their arrangement with respect to each other, wherewith I attain the objects of my invention, I shall now explain the method of working the same. Referring to Fig. 1, a fire is first kindled within the reduction furnace 1 and coke gradually charged into the furnace shaft 2 through the hopper 6, until the shaft is about two-thirds filled with glowing coke; meanwhile a light air blast, sufficient to accelerate combustion, is induced by means of the centrifugal fan 21 to flow through the coke mass. This is readily accomplished by closing valve 60 thereby cutting off the source of supply of the sulfur-bearing gases, and opening valve 61 which communicates with the atmosphere; the air so admitted enters the centrifugal fan which in turn delivers the air through the various pipes, valves and other passages leading to the reduction furnace. In brief, the reduction furnace is started just as any standard pressure-type gas-producer would be. The products of combustion, in the form of highly heated gases, are caused to pass through the recuperative or regenerative furnace (whichever may be employed) until the brickwork or other heat-transfer medium is thoroughly heated up to its normal working temperature. The air blast is now gradually cut off and at the same time the sulfur bearing gases are admitted into the system, in due course passing through the mass of highly heated coke wherein they are decomposed. As a specific example: In passing sulfur dioxid (contained in pyrite furnace gas) over a bed of incandescent coke, it has been determined that when the period of time during which the gas and coke were in contact amounted to five seconds, practically 5% of the sulfur-dioxid was reduced at a temperature of 800° C.; 34% was reduced at 900° C.; 63% at 1000° C.; 91% at 1100° C.; 96% at 1200° C.; and 98% at 1300° C. Within the limits mentioned, the higher the temperature maintained, the more rapid will be the formation of the elemental sulfur. Also, the amount of sulfur formed is found to increase in proportion to the length of time during which the gases containing the sulfur oxids are in contact with the incandescent carbon. In other words, either an increase in the depth of the incandescent mass of carbon through which the gases pass or a decrease in the velocity of the gases in passing through such an incandescent mass of carbon will result in a greater percentage of elemental sulfur formed.

The process is a continuous one and the separation of elemental sulfur from its gaseous compounds is rapidly and completely effected so long as the proper working temperatures are maintained in the manner hereinbefore set forth.

Referring to the furnace proper within which the reduction process is caused to take place, it will be understood that the size and shape of the furnace and its walls, the location and size of the inlet and outlet openings for the admission and escape of the gases, and whether said openings are so arranged as to cause the gases to pass vertically upward or downward or to pass horizontally through or over the mass of carbon or carbonaceous material, also the method of charging such material into the furnace and the method of removal of the ashes and clinker from the furnace have no bearing on my metallurgical or chemical process, other than to show one way by which it is carried into effect and may be materially modified without in the least departing from the scope of my invention.

I do not claim broadly herein the process of reducing sulfur dioxid to elemental sulfur which consists in maintaining the sulfur dioxid in contact with incandescent carbon for a predetermined period, and supplying the increment of heat necessary to secure practically complete reduction of the sulfur dioxid from a source independent of the oxidation of the carbon, such subject matter having claimed in a copending application of Lamoreaux and Renwick, above noted.

I claim:—

1. The process of reducing sulfur oxids to elemental sulfur, which consists in maintaining the sulfur oxid in contact with incandescent carbon for a predetermined period, and supplying the increment of heat necessary to secure practically complete reduction of the sulfur oxid to the gas stream before bringing the same into contact with the incandescent carbon.

2. The process of reducing sulfur oxids to elemental sulfur, which consists in maintaining the sulfur oxid in contact with incandescent carbon for a predetermined period, and supplying the increment of heat necessary to secure practically complete reduction of the sulfur oxid to the gas stream before bringing the same into contact with the incandescent carbon, a portion at least of said increment of heat being derived, by heat-interchange, from the out-flowing gases from the reduction chamber.

3. The process of reducing sulfur oxids to elemental sulfur, which consists in maintaining the sulfur oxid in contact with incandescent carbon for a predetermined period, and supplying the increment of heat necessary to secure practically complete reduction of the sulfur oxid to the gas stream before bringing the same into contact with the incandescent carbon, a portion of said increment of heat being derived, by heat-interchange, from the out-flowing gases from the reduction chamber, and further preheating at least a portion of the heated gases.

In testimony whereof I affix my signature in presence of two witnesses.

WILLIAM F. LAMOREAUX.

Witnesses:
 H. E. BROUGHTON,
 G. B. FARISS.